June 5, 1956  J. M. HALDEMAN  2,748,453
METHOD OF MAKING PISTON RINGS
Filed May 25, 1951  2 Sheets-Sheet 1

Inventor
John M. Haldeman
By Willits, Helmig & Baillio
Attorneys

June 5, 1956  J. M. HALDEMAN  2,748,453
METHOD OF MAKING PISTON RINGS
Filed May 25, 1951  2 Sheets-Sheet 2

Inventor
John M. Haldeman
By Willits, Helmig & Baillio
Attorneys

United States Patent Office 2,748,453
Patented June 5, 1956

2,748,453
METHOD OF MAKING PISTON RINGS

John M. Haldeman, Detroit, Mich., assignor to General Motors Corporation, Detroit, Mich., a corporation of Delaware Application May 25, 1951, Serial No. 228,207

12 Claims. (Cl. 29—156.6)

The invention relates to a process for making piston rings. The invention also relates to a fixture for supporting such piston rings while they are heat treated.

In the past piston rings have been predominantly made by casting processes which include numerous steps, such as casting, cutting, machining, finishing and heat treating, all of which involved considerable manual handling. The present invention contemplates the continuous forming of piston rings from wire stock. The present method of making such rings is more efficient and results in a more satisfactory piston ring than has heretofore been possible. The present method of making piston rings also varies from what has been generally accepted in the past in that a non-circular ring is formed. It has been found that moderately non-circular rings of studied shapes expand to seal a piston cylinder more efficiently than their circular predecessors. It is such a non-circular ring that is here considered. In previous methods of making non-circular piston rings, it has been the practice to initially form the ring in one shape, usually circular, and then by a subsequent operation forming the ring into a non-circular shape. The present invention forms the ring in its ultimate shape in the first instance, and provides a heat treating fixture which retains a plurality of such rings as formed while they are heat treated to relieve any internal stresses during the making thereof.

It is an object to the present invention to make a piston ring by bending wire stock.

It is also an object to make piston rings by a process which includes forming wire stock into non-circular shaped piston rings.

It is a further object to provide a piston ring heat treating fixture which will retain the ring in its proper shape during a normalizing process.

Other objects and advantages will be apparent from the description which follows.

Figure 1:
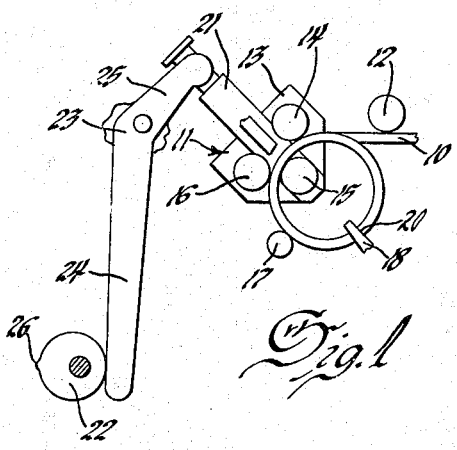
Figure 1 is a diagrammatic sketch of a ring forming and cutting machine.

Referring to Figure 1 of the drawings, a preformed rectangular steel wire stock 10 is led into a ring forming machine 11. The wire is guided by a roller 12 so as to enter the head 13 between rollers 14, 15 and 16. As the wire leaves the head 13, it is further guided by member 17. After a sufficient length of wire has passed through head 13 to form a ring, a cutter 18 cuts off a ring 19 having a gap 20 therein. The machine as thus far described would be capable only of producing a series of circular rings. In the present invention it is desired to produce non-circular piston rings. To form a non-circular ring, roller 15 is mounted on a slidable member 21. The sliding movement of member 21 is controlled by a cam 22 through a pivoted lever 23 having one arm 24 which follows the cam and another arm 25 secured to the sliding member 21. It will thus be seen that the shape of the piston ring will be determined by the shape of the cam and that any shaped ring, within the limits of such a cam, may be obtained. For the sake of illustrating the invention, a particular shape of cam will be described which produces a piston ring that has been successful in operation. The ring that is sought to be formed would, if exaggerated, be somewhat apple or oval shaped, or a shape comprised of two involutes. Such a shape is obtained by a cam, the surface of which may be best described as the locus of the end points of radii of constantly decreasing length through slightly less than 180° in one direction and the same in the other direction beginning from the same point. The small remaining portion of the cam surface is a convex hump 26 projecting from the cam surface. The small hump that is formed on the ring is the portion that is cut out by the cutter 18 to form the gap 20. Thus it will be seen that a piston ring is formed which has a constantly increasing curvature toward the gap, the ring having a minimum curvature opposite the gap.

Figure 2:
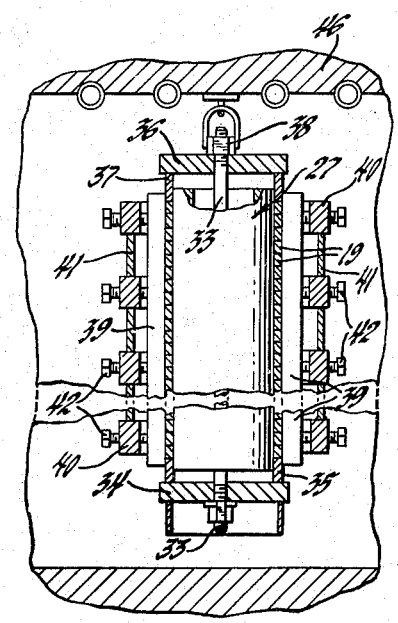
Figure 2 shows a heat treating fixture and piston rings disposed within a heat treating furnace.
Figure 3:
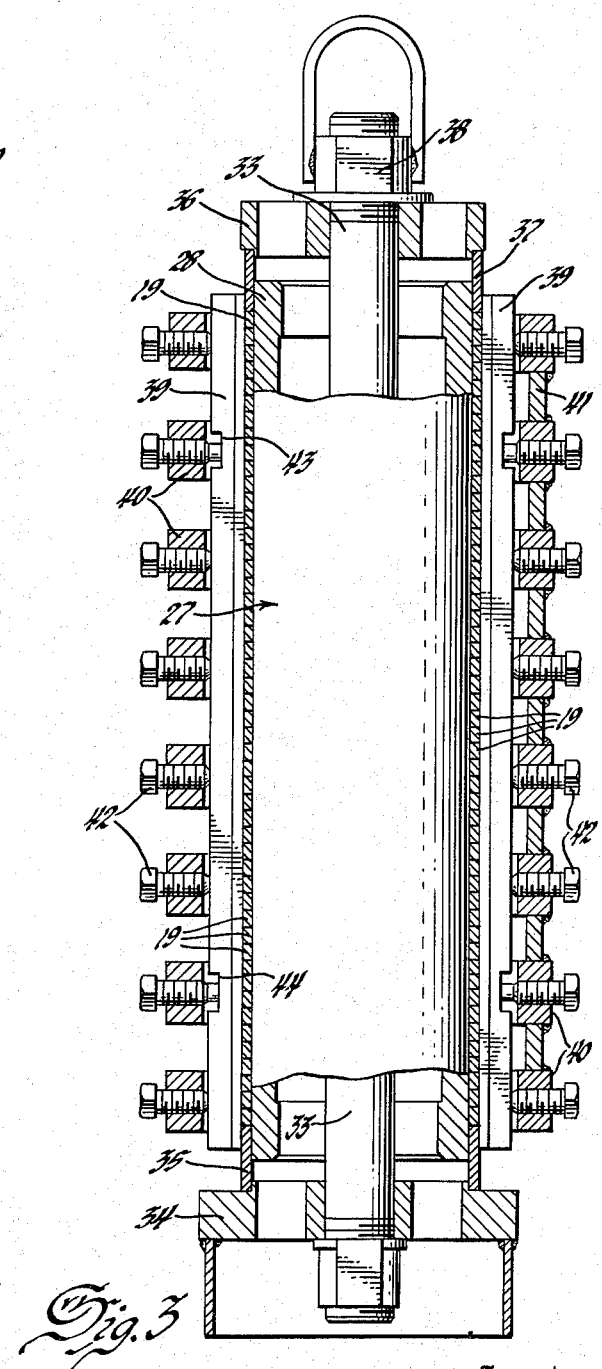
Figure 3 shows an enlarged sectional view of the heat treating fixture.
Figure 4:
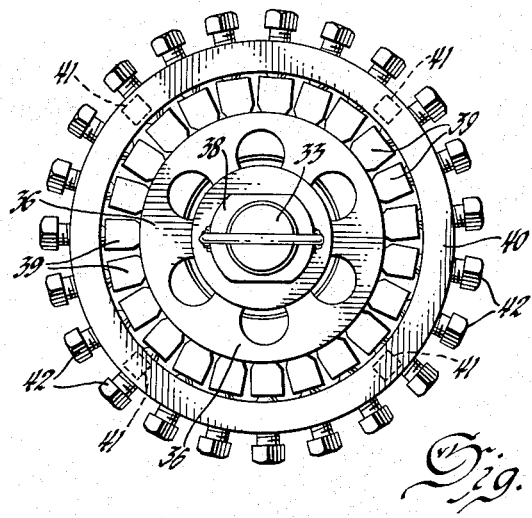
Figure 4 is a plan view of the heat treating fixture.
Figure 5:
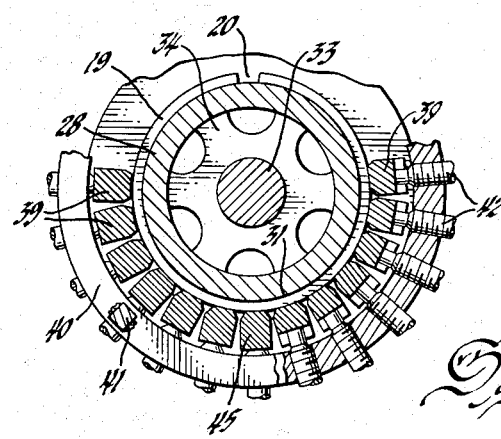
Figure 5 is a fragmentary cross-sectional view of the heat treating fixture.
Figure 6:
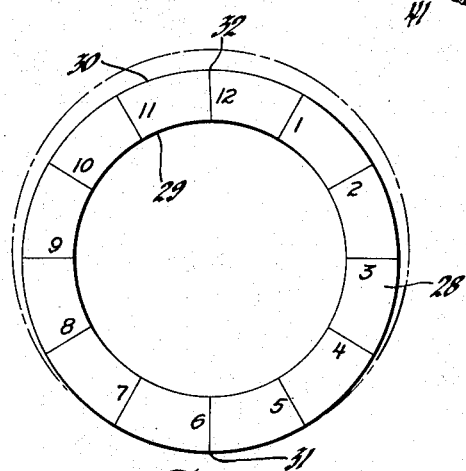
Figure 6 is a diagrammatic plan view of a non-circular mandrel for the heat treating fixture.

The ring, as it is discharged from the bending machine 11, is of the ultimately desired shape. However, in the forming or bending of the wire to make the piston ring internal stresses are induced therein and which it is necessary to relieve in order to have a satisfactory piston ring. Therefore, it is a most important part of the invention to disclose a heat treating fixture which will retain the piston rings as formed while they are being heat treated. For this purpose a heat treating fixture 27 has been developed. Fixture 27 consists broadly of a mandrel, longitudinal clamping means and radial clamping means. The shape of mandrel 28 is shown in Figure 6, and consists of the hollow member, the outer periphery of which is the same shape as the piston ring described above. The radial distance between the inner cylindrical surface 29 and the peripheral surface 30 constantly decreases from the point of minimum curvature at 31 toward the area of maximum curvature at 32. The mandrel is adapted to peripherally receive a stack of said rings, as shown in Figures 2 and 3. In order to insure that the rings will be longitudinally supported on the mandrel and lie flat against each other, a longitudinal supporting and compressing means is provided. Such a means consists of a bolt 33 threaded at each end and longer than the mandrel 28. Secured to one of bolt 33 is an anchor plate 34 having an annular upstanding portion 35 secured centrally thereof and adapted to partially overlie the mandrel. Similarly, secured to the other end of the bolt is a cap plate 36 having a depending annular portion 37 also adapted to partially overlie the mandrel. The bolt 33 and anchor plate 34 are assembled and the bolt inserted through mandrel 28 such that portion 35 overlies part of said mandrel. The rings are now placed over the mandrel so as to seat on portion 35. Next cap plate 36 is secured to the bolt and moved downwardly by a nut 38 such that the stack of rings is compressed between plates 34 and 36.

The radial clamping means consists of a plurality of longitudinal bars 39 which circumscribe the mandrel and rings. The bars are supported within a framework which consists of a plurality of parallel annular rings 40. The annular rings 40 are spaced by a multiplicity of longitudinal struts 41 secured therebetween. The bars 39 are adapted to be moved radially such that the piston rings can be securely held against the contour of the mandrel. Any well-known means, mechanical, hydraulic, pneumatic, or electric, may be associated with the annular rings 40 so as to move bars 39 radially. To simply illustrate such means, screws 42 are provided as the means for moving said bars. To move each bar the appropriate longitudinal row of screws is moved thereagainst. Grooves 43 and 44 are formed in bars 39 and into which the adjacent radial row of screws are adapted to fit so as to prevent the bars from sliding out of the framework when the fixture is disassembled.

The sub-assembly of mandrel, piston rings and longitudinal clamping means as described above is inserted within the longitudinal bars and the bars then moved radially against the stack of rings. A most important feature of the fixture 27 is providing such longitudinal bars which may be moved in a definite sequence against the rings so as to insure proper radial engagement of said rings with said mandrel. The rings are placed on mandrel 28 with the gaps 20 longitudinally aligned such that they lie adjacent the point 32 on the mandrel surface opposite the point of minimum curvature 31. The bars are then moved inwardly in the following sequence: First, the bar 45 adjacent the point of minimum curvature 31 and then alternately the bars to the left and right of bar 45 proceeding in the direction of the gaps 20 such that the last bars to be engaged are those adjacent said gaps. Such a fixture insures that the piston rings will be held securely against the mandrel so that their initial shape will be maintained during heat treating. The fixture as assembled is then placed in a heat treating furnace 46 in any feasible manner, such as that shown in Figure 2, and the entire assembly subjected to normalizing temperatures whereby the stresses within said rings are relieved.

Although I have shown and described a preferred embodiment of my invention, it is to be understood that this has been done by way of illustration and that the scope of my invention is limited only by the appended claims.

I claim:

1. A method of making piston rings which comprises bending a metallic strip to form a ring, placing the ring on a mandrel having an exterior surface substantially identical to the form of the inner surface of said ring, applying radially inwardly directed forces substantially throughout the entire length of said ring and to the exterior surface of said ring to secure said ring rigidly to the exterior surface of said mandrel, and thereafter heating said ring while so held against said mandrel to relieve the internal stresses in said ring caused by the bending of said strip.

2. A method of making piston rings which comprises bending a metallic strip at an increasing rate from the middle toward the opposite ends thereof to form a ring of greater curvature adjacent the ends than at the middle of said ring, placing said ring on a mandrel having an exterior surface substantially identical to the form of the inner surface of said ring, applying radially inwardly directed forces substantially throughout the entire length of said ring and to the exterior surface of said ring to secure said ring rigidly to the exterior surface of said mandrel, and thereafter heating said ring while so held against said mandrel to relieve the internal stresses in said ring caused by the bending of said strip.

3. A method of making piston rings which comprises bending a metallic strip at an increasing rate from the middle toward the opposite ends thereof to form a ring of greater curvature adjacent the ends than at the middle of said ring, placing said ring on a mandrel having an exterior surface substantially identical to the form of the inner surface of said ring, applying radially inwardly directed forces substantially throughout the entire length of said ring and to the exterior surface of said ring and progressively from the middle toward the opposite ends of said ring to secure said ring rigidly to the exterior surface of said mandrel, and thereafter heating said ring while so held against said mandrel to relieve the internal stresses in said ring caused by the bending of said strip.

4. A method of making piston rings which comprises bending successive lengths of a continuous metallic strip to form a ring of each length of said strip, cutting said rings from said strip by severing said strip between said lengths, placing said rings on a mandrel having an exterior surface substantially identical to the form of the inner surface of said rings, applying radially inwardly directed forces substantially throughout the entire length of said rings and to the exterior surfaces of said rings to secure said rings rigidly to the exterior surface of said mandrel, and thereafter heating said rings while so held against said mandrel to relieve the internal stresses in said rings caused by the bending of said lengths.

5. A method of making piston rings which comprises bending successive lengths of a continuous metallic strip at an increasing rate from the middle toward the opposite ends of said lengths to form rings of greater curvature adjacent the ends than at the middle of said rings, cutting said rings from said strip by severing said strip between said lengths, placing said rings on a mandrel having an exterior surface substantially identical to the form of the inner surface of said rings, applying radially inwardly directed forces substantially throughout the entire length of said rings and to the exterior surfaces of said rings to secure said rings rigidly to the exterior surface of said mandrel, and thereafter heating said rings while so held against said mandrel to relieve the internal stresses in said rings caused by the bending of said lengths.

6. A method of making piston rings which comprises bending successive lengths of a continuous metallic strip at an increasing rate from the middle toward the opposite ends of said lengths to form rings of greater curvature adjacent the ends than at the middle of said rings, cutting said rings from said strip by severing said strip between said lengths, placing said rings on a mandrel having an exterior surface substantially identical to the form of the inner surface of said rings, applying radially inwardly directed forces substantially throughout the entire length of said rings and to the exterior surfaces of said rings and progressively from the middle toward the opposite ends of said rings to secure said rings rigidly to the exterior surface of said mandrel, and thereafter heating said rings while so held against said mandrel to relieve the internal stresses in said rings caused by the bending of said lengths.

7. A method of making piston rings which comprises bending a plurality of metallic strips to form a plurality of rings, placing said rings on a mandrel having an exterior surface substantially identical to the form of the inner surface of said rings, applying radially inwardly directed forces substantially throughout the entire length of said rings to the exterior surfaces of said rings to secure said rings rigidly to the exterior surface of said mandrel, and thereafter heating said rings while so held against said mandrel to relieve the internal stresses in said rings caused by the bending of said strips.

8. A method of making piston rings which comprises bending a plurality of metallic strips at an increasing rate from the middle toward the opposite ends of said strips to form rings of greater curvature adjacent the ends than at the middle of said rings, placing said rings on a mandrel having an exterior surface substantially identical to the form of the inner surface of said rings, applying radially inwardly directed forces substantially throughout the entire length of said rings to the exterior surfaces of said rings to secure said rings rigidly to the exterior surface of said mandrel, and thereafter heating said rings while so held against said mandrel to relieve the internal stresses in said rings caused by the bending of said strips.

9. A method of making piston rings which comprises bending a plurality of metallic strips at an increasing rate from the middle toward the opposite ends of said strips to form rings of greater curvature adjacent the ends than at the middle of said rings, placing said rings on a mandrel having an exterior surface substantially identical to the form of the inner surface of said rings, applying radially inwardly directed forces substantially throughout the entire length of said rings to the exterior surfaces of said rings and progressively from the middle toward the opposite ends of said rings to secure said rings rigidly to the exterior surface of said mandrel, and thereafter heating said rings while so held against said mandrel to relieve the internal stresses in said rings caused by the bending of said strips.

10. A method of making piston rings which comprises bending a plurality of metallic strips at an increasing rate from the middle toward the opposite ends of said strips to form rings of greater curvature adjacent the ends than at the middle of said rings, placing said rings on a mandrel having an exterior surface which increases in curvature in opposite directions from one side to the other and which is substantially identical in form to the form of the inner surface of said rings and with said rings being placed on said mandrel with the inner surface of said rings disposed in directly opposed relation to the surface of said mandrel corresponding to the curvature of said rings, applying radially inwardly directed forces substantially throughout the entire length of said rings to the exterior surface of said rings and progressively from the middle toward the opposite ends of said rings to secure said rings rigidly to the exterior surface of said mandrel, and thereafter heating said rings while so held against said mandrel to relieve the internal stresses in said rings caused by the bending of said strips.

11. A method of making piston rings which comprises bending a plurality of metallic strips to form a plurality of rings, placing a stack of said rings on a mandrel having an exterior surface substantially identical to the form of the interior surfaces of said rings, applying axial forces to the opposite ends of said stack to compress said rings in said stack, applying radially inwardly directed forces substantially throughout the entire length of said rings to the exterior surfaces of said rings to secure said rings rigidly to the exterior surface of said mandrel, and thereafter heating said rings while so held against said mandrel to relieve the internal stresses in said rings caused by the bending of said strips.

12. A method of making piston rings which comprises bending a plurality of metallic strips to form a plurality of rings, placing a stack of said rings on a mandrel having an exterior surface substantially identical to the form of the interior surfaces of said rings, applying axial forces to the opposite ends of said stack to compress said rings in said stack, applying radially inwardly directed and axially aligned forces substantially throughout the entire length of said rings to the exterior surfaces of said rings to secure said rings rigidly to the exterior surface of said mandrel, and thereafter heating said rings while so held against said mandrel to relieve the internal stresses in said rings caused by the bending of said strips.

References Cited in the file of this patent

UNITED STATES PATENTS

| Number | Name | Date |
|---|---|---|
| 1,107,005 | White | Aug. 11, 1914 |
| 1,264,462 | Wasson | Apr. 30, 1918 |
| 1,291,700 | Acton | Jan. 21, 1919 |
| 1,292,219 | Acton | Jan. 21, 1919 |
| 1,556,011 | Fisher | Oct. 6, 1925 |
| 1,686,937 | Six | Oct. 9, 1928 |
| 1,859,057 | Six | May 17, 1932 |
| 1,897,397 | Porter | Feb. 14, 1933 |
| 1,997,534 | Oubridge | Apr. 9, 1935 |
| 2,033,093 | Covert | Mar. 3, 1936 |
| 2,140,682 | Strauss | Dec. 20, 1938 |
| 2,229,477 | Shannon | Jan. 21, 1941 |
| 2,311,919 | Zahodiakin | Feb. 23, 1943 |
| 2,379,627 | Davis | July 3, 1945 |